March 3, 1953     I. M. KIRLIN     2,630,521
ENCLOSED LAMP RECEPTACLE WITH OUTLET BOX ATTACHED
Filed Sept. 22, 1949     2 SHEETS—SHEET 1
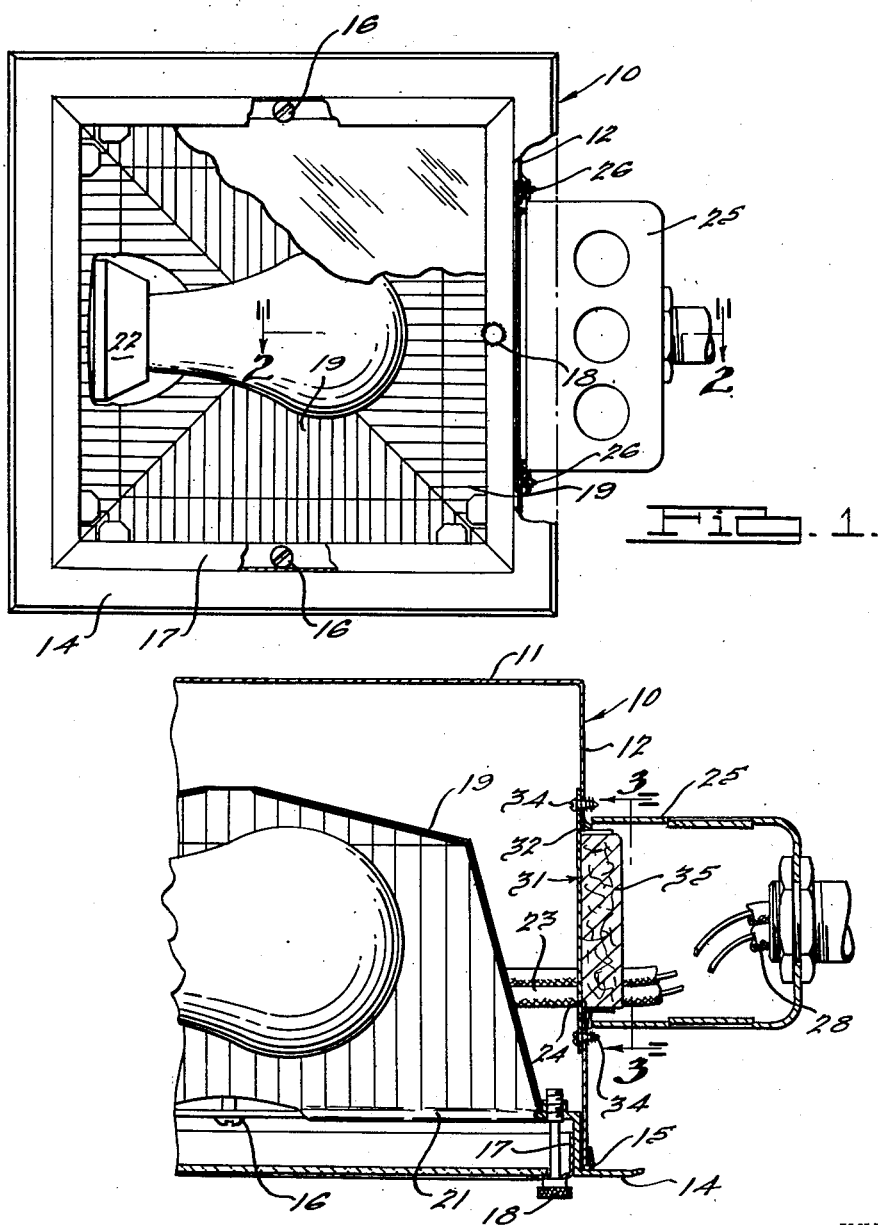
INVENTOR.
Ivan M. Kirlin.
BY
Harness, Dickey & Pierce
ATTORNEYS.

March 3, 1953  I. M. KIRLIN  2,630,521
ENCLOSED LAMP RECEPTACLE WITH OUTLET BOX ATTACHED
Filed Sept. 22, 1949  2 SHEETS—SHEET 2
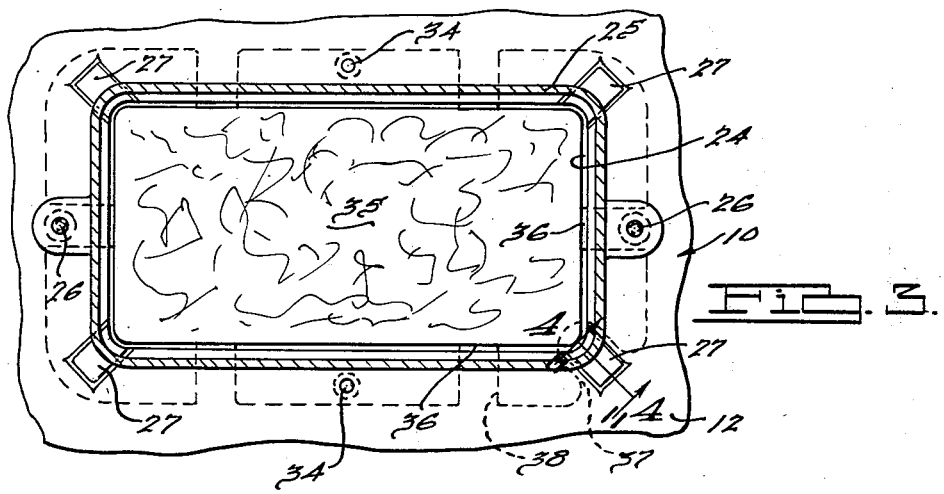
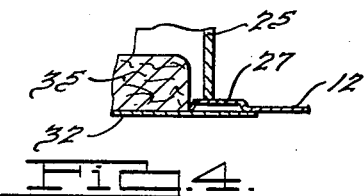
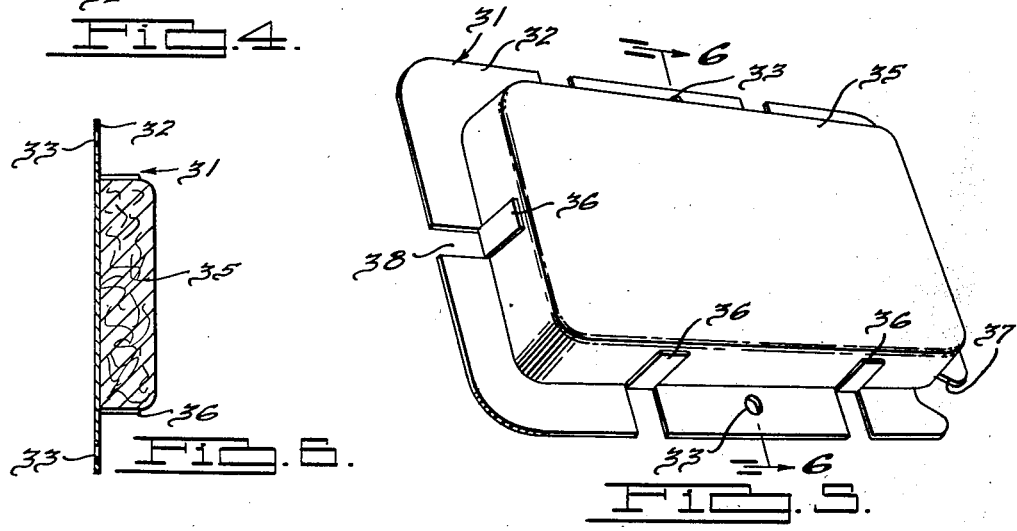
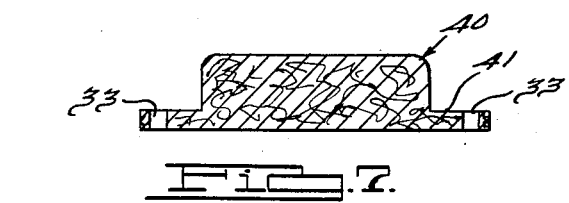
INVENTOR.
Ivan M. Kirlin.
BY
Harness, Dickey & Pierce
ATTORNEYS.

Patented Mar. 3, 1953

2,630,521

UNITED STATES PATENT OFFICE 2,630,521

ENCLOSED LAMP RECEPTACLE WITH OUTLET BOX ATTACHED

Ivan M. Kirlin, Detroit, Mich., assignor to The Kirlin Company, a partnership

Application September 22, 1949, Serial No. 117,139

3 Claims. (Cl. 240—78)

This invention relates to recessed lighting fixtures, and particularly to a recessed lighting fixture having a junction box attached directly to the recess box thereof.

In the recessed type of lighting fixture, wherein all of the fixture is recessed within a wall or ceiling, difficulty has always been experienced in view of the heat developed within the recess box. The socket mounted within the box in which the lamp is screwed is provided with conductors having thermal insulating covering of a length to extend beyond the box to make a connection with standard rubber-covered wire remotely therefrom. This was necessary in order to make certain that the junction box was sufficiently remote from the recess box to prevent the heat therefrom from damaging the rubber insulation on the conductors.

To overcome this difficulty of connecting the high temperature insulated wires within the recess box to those of the junction box, the present invention was made. This embodies the insulation of the junction box in such manner that it may be applied directly to the recess box. This is accomplished by attaching the junction box over an opening in the recess box, with the junction box spaced from the recess box to substantially limit the direct flow of heat therebetween. A cover is provided, having thermal insulation characteristics, which projects within the junction box when secured to the inside of the recess box to insulate the opening therethrough. With this arrangement, the conductors in the recess box may be connected to the rubber-covered conductors from the junction box in the conventional manner, and the portions of the conductors adjacent to the connections are then disposed within the junction box. The cover having thermal insulating characteristics is secured to the inside of the recess box over the opening into the junction box. It was found that by spacing the junction box from the recess box and providing the proper thermal insulating characteristics to the cover that the connection within the junction box is capable of passing the laboratories' requirements as to the rise of temperature within the latter box.

Accordingly, the main objects of the invention are: to mount a junction box on the wall of a recess box of a recessed lighting fixture; to mount a junction box in spaced relation to the wall of the recess box about an opening therethrough and enclose the opening with a cover having thermal insulating characteristics; to provide a cover for an opening in a recess box for insulating an opening to a junction box which is made of metal having tongues extending therefrom which secure a block of thermal insulating material to one face thereof; to provide a cover for closing an opening in a recess box for insulating a junction box attached thereto which is made of thermal insulating material, and, in general, to provide a recessed lighting fixture with the junction box secured thereto and insulated therefrom in a manner which is simple in construction and economical of manufacture.

Other objects and features of novelty of the invention will be specifically pointed out or will become apparent when referring, for a better understanding of the invention, to the following description taken in conjunction with the accompanying drawings, wherein:

Figure 1 is a broken plan view of a recessed lighting fixture having a junction box attached to the recess box thereof;

Fig. 2 is an enlarged sectional view of the structure illustrated in Fig. 1, taken on the line 2—2 thereof;

Fig. 3 is a sectional view of the structure illustrated in Fig. 2, taken on the line 3—3 thereof;

Fig. 4 is a broken sectional view of the structure illustrated in Fig. 3, taken on the line 4—4 thereof;

Fig. 5 is an enlarged perspective view of the cover illustrated in Fig. 2;

Fig. 6 is a sectional view of the structure illustrated in Fig. 5, taken on the line 6—6 thereof, and Fig. 7 is a view of structure, similar to that illustrated in Fig. 6, showing a modified form thereof.

The recessed lighting fixture, as illustrated in Figs. 1 and 2, embodies a recess box 10 which may be square, rectangular or of other shape, having a base 11 and four side walls 12. A frame 14, which is preferably a casting, is secured to the top edge 15 of the box by screws 16 which are threaded into a pair of internal brackets secured to the walls 12, not herein illustrated. A lens-supporting frame 17 is hinged at one end of the frame 14 within a recess therein and is screwed to the frame by a thumb screw 18 carried by the lens frame 17. This construction is illustrated and described in the copending application of Ivan M. Kirlin, Serial No. 99,923, filed June 18, 1949, now Patent No. 2,614,667, and assigned to the assignee of the present invention.

A reflector 19 is mounted within the box and supported on the frame by the reversely bent flanged ends 21. A socket 22 is mounted on one of the walls 12 of the recess box 10, having a pair of conductors 23 extending therefrom which are covered by a material having thermal insulating characteristics. The base 11 or wall 12 of the recess box is provided with an aperture 24 which is rectangular in shape and of less area than the open end of the junction box 25 which is secured thereover. The junction box is of standard construction and is secured to the wall of the recess box 10 by a pair of screws 26, as illustrated more specifically in Fig. 3. Embossed areas 27 are provided at the corners of the opening 24 for spacing the junction box 25 from the wall so as to reduce the thermal conductivity between the metal of the recess box and that of the junction box.

A pair of rubber-covered conductors 28, illustrated in Fig. 2, will extend within the junction box where the conventional connection will be made to the conductors 23 having asbestos or similar thermal insulating material thereon. The connection is made within the recess box and the adjacent portions of the conductors are then passed through the opening 24 into the junction box in position to have the rubber-covered portion of the conductor 28 protected from the heat developed in the recess box.

After the connection has been made to the supply conductors, a heat insulating cover 31 is applied to the opening 24 in the recess box, which substantially reduces the heat which may pass from the recess box to the junction box. The cover 31, as illustrated more specifically in Figs. 5 and 6, embodies a metal plate 32 of a size to extend over the opening 24, having a pair of apertures 33 therein by which the plate is secured over the opening by screws 34 which may be of the metal type. A block of insulating material 35 is secured to the face of the plate by suitable adhesive or by a plurality of tongues 36 struck from the edge of the plate 32 or by both the adhesive and tongues. A slot 37 is provided at one corner of the plate 32 to form an opening for the conductors 23 which extend within the junction box. Slots 38 at each end of the plate straddle the screws 26 which support the junction box to the recess box and permit the plate to register flush with the inner surface of the recess box about the opening 24 thereof.

In Fig. 7 a further form of cover 40 is illustrated, that wherein the entire cover is made of a thermal insulating material having a flange 41 thereabout containing the apertures 33 and the slots 37 and 38 for the purpose above described with regard to the cover 31 of Figs. 5 and 6. Sufficient thermal insulation is provided for the junction box by the spacing of the box from the wall of the recess box and the insulating cover to meet the laboratories' requirements as to the minimum temperature for rubber-covered conductors. The installation of the recessed type of lighting fixture is substantially simplified by the application of the junction box directly to one wall of the recess box.

What is claimed is:

1. A lighting fixture including, in combination, a recess box having four side walls and an end wall, a light receptacle supported in said box, said box having an aperture remote from receptacle through one of its walls, said aperture being substantially the size of the open face of a junction box, a cover for said aperture of thick heat insulating material which fits snugly in said aperture when extending therethrough and projecting a substantial distance beyond the outer surface of the wall containing the aperture, means for releasably securing said cover in said aperture, and means by which a junction box is supported on the outer face of said last wall over the aperture contained therein, with the cover extending into the junction box.

2. A lighting fixture including, in combination, a recess box having four side walls and an end wall, a light receptacle supported in said box, said box having an aperture remote from said receptacle through one of its walls, said aperture being substantially the size of the open face of a junction box, a cover for said aperture of thick heat insulating material which fits snugly in said aperture when extending therethrough and projecting a substantial distance beyond the outer surface of the wall containing the aperture, said cover having a flange projecting outwardly beyond the portion which extends through said aperture to overlie the inner surface of said wall about said aperture, releasable means for securing said cover to said wall, and a junction box aligned with said aperture and supported on the outer surface of said wall in a manner to have the cover extend thereinto.

3. A lighting fixture including, in combination, a recess box having four side walls and an end wall, a light receptacle supported in said box, said box having an aperture remote from said receptacle through one of its walls, said aperture being substantially the size of the open face of a junction box, a cover for said aperture having a thick heat insulating portion which snugly fits said aperture when extending therethrough to project a substantial distance therebeyond, embossments in the edge of the wall portion defining said aperture extending outwardly of the outer wall surface, and an open-faced junction box directly attachable to the wall with the open face aligned with the aperture thereof in position to have a section of said thick insulating portion of the cover extend thereinto and with the major portion of the edge of the junction box spaced from the wall containing the aperture by the embossments therein.

IVAN M. KIRLIN.

REFERENCES CITED

The following references are of record in the file of this patent:

UNITED STATES PATENTS

| Number | Name | Date |
|---|---|---|
| 1,272,505 | O'Hara | July 16, 1918 |
| 1,748,352 | Knapp | Feb. 25, 1930 |
| 1,799,304 | Logan | Apr. 7, 1931 |
| 1,809,864 | Pearson | June 16, 1931 |
| 1,952,695 | Webb et al. | Mar. 27, 1934 |
| 2,022,222 | Sullivan | Nov. 26, 1935 |
| 2,167,184 | Phillips | July 25, 1939 |
| 2,227,655 | Levy | Jan. 7, 1941 |
| 2,313,131 | Elias | Mar. 9, 1943 |
| 2,433,241 | Schwarzmayr | Dec. 23, 1947 |
| 2,561,986 | Jones | July 24, 1951 |